United States Patent [19]

Finger

[11] Patent Number: 4,852,104
[45] Date of Patent: Jul. 25, 1989

[54] SOLID-STATE READER DEVICE FOR A CUMULATIVE OPERATIONS MEASUREMENT SYSTEM

[75] Inventor: Eugene P. Finger, Brewster, N.Y.

[73] Assignee: Curtis Instruments, Inc., Mount Kisco, N.Y.

[21] Appl. No.: 71,801

[22] Filed: Jul. 10, 1987

[51] Int. Cl.$^4$ ............................................. G06F 11/34
[52] U.S. Cl. ......................................... 371/57; 377/16
[58] Field of Search ...................... 371/57; 377/16, 28, 377/32; 364/550

[56] References Cited

U.S. PATENT DOCUMENTS

| | | | |
|---|---|---|---|
| 3,939,333 | 2/1976 | Keech | 377/28 |
| 4,112,926 | 9/1978 | Schulman et al. | 377/16 |
| 4,366,373 | 12/1982 | Metcalf | 377/16 |
| 4,547,891 | 10/1985 | Avellino et al. | 377/16 |
| 4,712,195 | 12/1987 | Finger | 365/226 |

Primary Examiner—Charles E. Atkinson
Attorney, Agent, or Firm—John F. Ohlandt

[57] ABSTRACT

A reader device, preferably implemented in solid-state form, is provided as a separate element for connecting to a so-called cumulative operations measurement system. Such a system is, for example, concerned with the measurement of elapsed time, especially in determining how long a particular piece of apparatus may have been functioning; or, on the other hand, measuring events such as the number of times a particular piece of apparatus has been turned on without regard to the elapsed time. The reader device is preferably provided with its own source of power, or it can rely on the power source contained within the operations measurement system. The reader device is designed on a conservative basis such that it carefully monitors the frequency involved in the measurement system, and determines whether the measurement system is operating at the correct frequency; furthermore, whether there are low-voltage battery conditions present in the system; a special filter arrangement is provided such that a very low data rate can be employed.

21 Claims, 10 Drawing Sheets

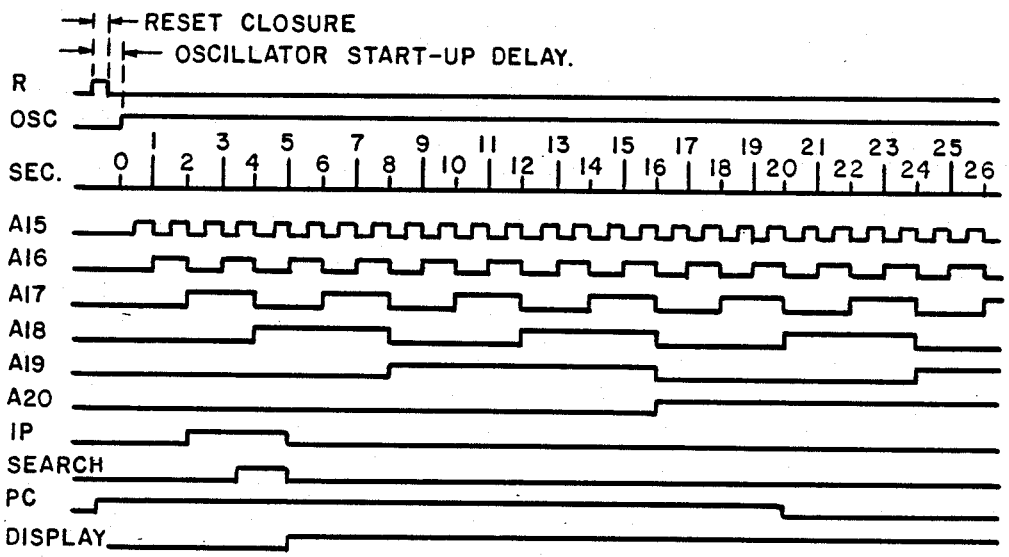
FIG. 8 SEQUENCER TIMING FOR FIRST 26 SECONDS.
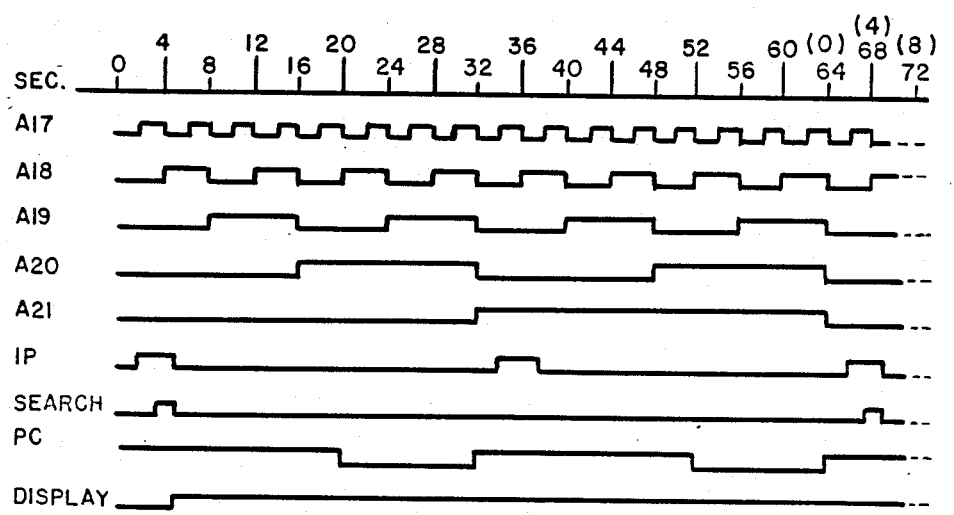
FIG. 9 SEQUENCER TIMING FOR ANY FULL 64 SECOND CYCLE.
DISPLAY REMAIN a LOGICAL "1" FOR ALL CYCLES SUBSEQUENT TO THE FIRST CYCLE.
PC GOES TO LOGICAL "1" AT THE BEGINNING OF RESET (R) DURING THE FIRST CYCLE AND ON THE FALLING EDGE OF A20 ON SUBSEQUENT CYCLES.

A13 FREQUENCY = 4 HERTZ
$A_M$ THRU $G_M$ CONTROL BOTH DIGIT & SEGMENT SELECTION.

SOLID-STATE READER DEVICE FOR A CUMULATIVE OPERATIONS MEASUREMENT SYSTEM

BACKGROUND OF THE INVENTION

This invention relates to improved cumulative operations measurement systems, and more particularly to a reader device, preferably in solid-state form, for reading out the total operations recorded by such a measurement system for a given piece of apparatus. An example of such a cumulative operations measurement system is one which is sometimes referred to as "an elapsed time indicator", such an indicator being designed to record the total time that has elapsed in the operation of a given apparatus. Another system is one which simply records events such as, for example, the number of times that a particular piece of apparatus has been turned on.

A particular cumulative operations measurement system, with which the present reader device is especially designed to function, is disclosed in co-pending application Ser. No. 861,339, now U.S. Pat. No. 4,712,195 issued 12-8-87 assigned to the assignee of the present invention. A reader device in schematic form is illustrated in that application. The entire disclosure of the co-pending application is incorporated by reference herein.

A primary object of the present invention is to provide a reader device that will enable a high degree of accuracy and reliability in the reading of the data involved, and will ensure that there has been no data alteration in the system. Furthermore, it is a related object to design the reader conservatively such that thorough checks can be performed to guarantee that there has been no data alteration.

Another object of the present invention is to provide a simple, efficient, and cost-effective reader for a measurement system that functions to take or record cumulative operations measurements on machines or apparatus of various types.

A further object of the present invention is to provide, as part of the reader device, an improved, economical logic layout, whereby a relatively small amount of "chip real estate" is taken up in the logic operations required to produce the desired display of a number being read.

Another object is, in implementing the previously stated objects, to provide a filter arrangement associated with the reader whereby the reading of data can be accomplished by simplified digital electronics. As a consequence, a very low data rate can be utilized in the reading of data. For example, a rate of 500 Hz is preferably selected for the system.

SUMMARY OF THE INVENTION

In carrying out the invention the above-stated objects are realized in a reader device or apparatus which has its own specialized pulse power source; preferably, that power source is included in a custom chip; that is to say, in an integrated circuit that is specially designed to accomplish the aforenoted objects, being capable of providing a variety of functions for the reader.

Briefly stated, the primary feature of the present invention resides in the reader device or apparatus for reading the data recorded in a cumulative operations measurement system, the reader comprising a source of pulse power; interconnection means for transmitting such power located at said reader device to a transducer contained in the measurement system; further included are means for first providing power to the reader device then, providing power to the measurement system; means for subsequently acquiring the data from the measurement system and displaying such data, further including means for providing plural checks and for indicating faults in the system.

In addition to the above-noted means forming the reader device, a filter arrangement is included, such filter arrangement being comprised of certain elements of the measurement system as well as elements if the reader device. The particular design of the filter arrangement stems from the fact that a necessarily high output impedance is present in the measurement system, such impedance being on the order of 100,000 ohms. This high output impedance provides damage protection and insures against incorrect hookups, electrostatic discharge, and like problems. By providing that the reader device includes appropriately selected filter components, the reading of data from the measurement system can thereby be accomplished by simplified digital electronics, as previously noted in the objects of the invention. Accordingly, a very low data transmission rate can be selected for the composite system.

The specific arrangement for accomplishing the above noted functions includes a time base, sequencing, and strobing means; a shift right register and driver means; a digit selector, intensity modulator, and leading-zero blanking means; a segment concentrator means; and a means comprising binary-coded-decimal-to-seven-segment decoder and specialized generator, called a seven dashes generator, for indicating bit errors.

In the design of the logic for achieving appropriate results as the reader device functions to acquire data from the measurement system and to display such data, emphasis has been placed on economy, that is, in providing a logic layout that utilizes a minimum amount of space on a chip. The particular design may be likened to a mechanical analog, that is, to a Venturi construction well known in hydraulics. However, the "narrowing down" effect, which saves significant space, is accomplished, in this particular case, by time division in the logic progression of signals from input to display. This feature will become apparent as the description proceeds.

Other and further objects, advantages and features of the present invention will be understood by reference to the following specification in conjunction with the annexed drawings, wherein like parts have been given like numbers.

BRIEF DESCRIPTION OF THE DRAWINGS

FIG. 8 is a timing diagram depicting the sequencer timing for the first twenty six seconds of operation.

FIG. 9 is another timing diagram similar to that of FIG. 8, but showing the sequencer timing for a full 64 second period.

DESCRIPTION OF PREFERRED EMBODIMENT

Figure 1:
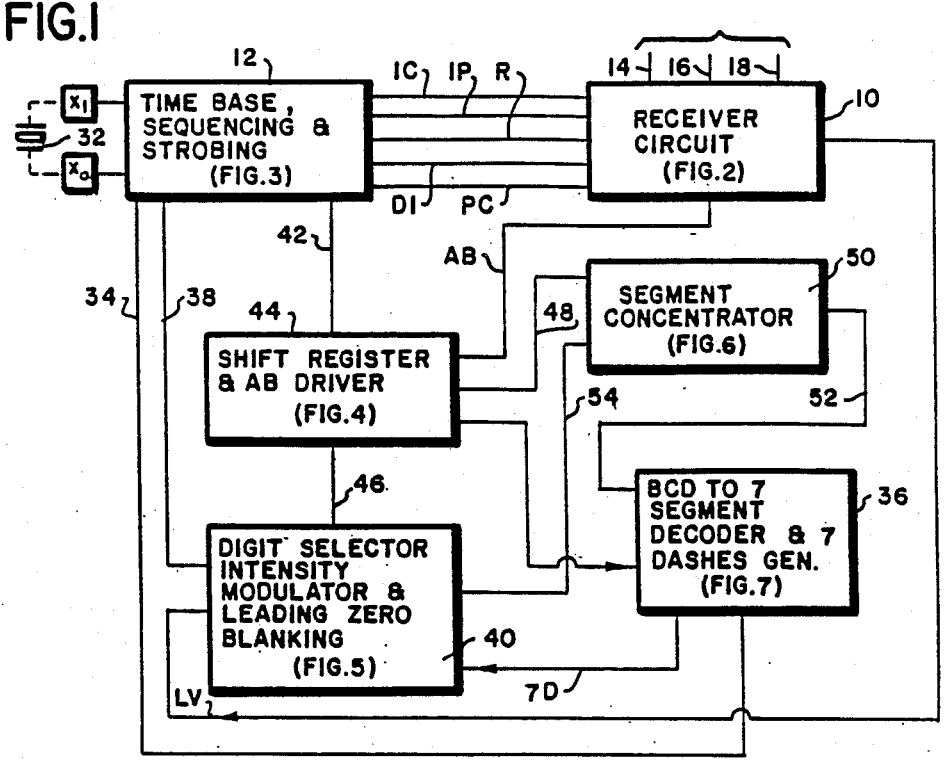
FIG. 1 is a block diagram which illustrates the complete reader device or system in accordance with the preferred embodiment of the present invention.
Figure 2:
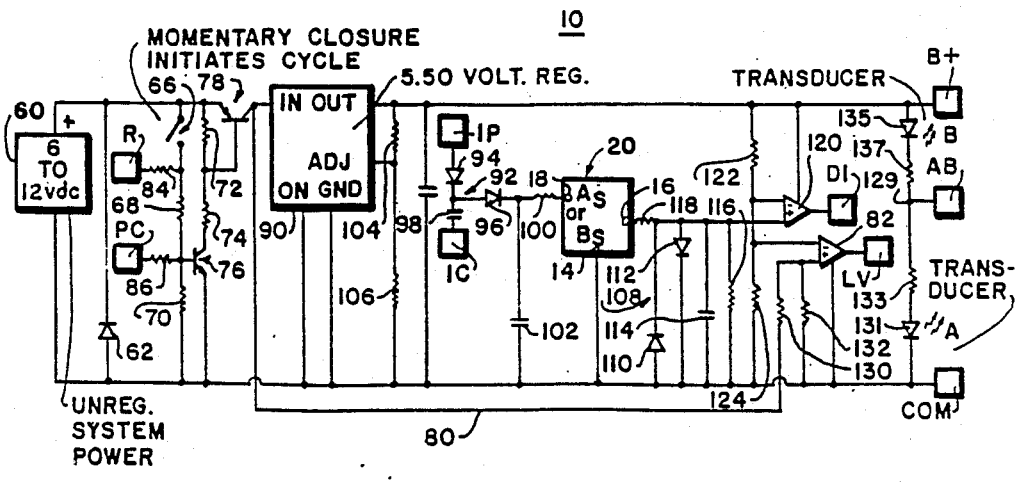
FIG. 2 is a block-schematic diagram of a main receiver circuit of the reader device.
Figure 3:
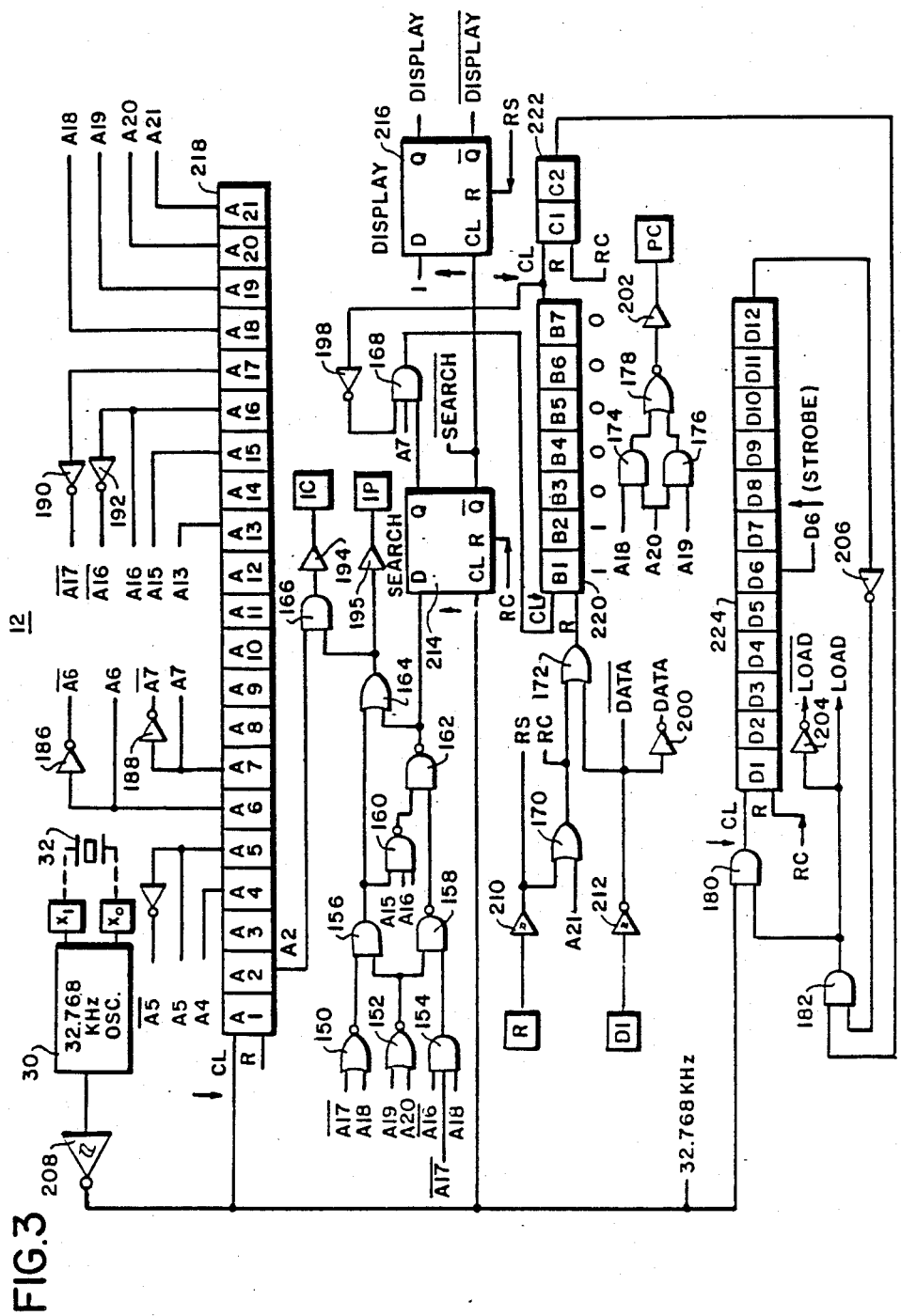
FIG. 3 is a block-schematic diagram of a means comprising a time base, sequencing and strobing arrangement forming part of the reader device.

Referring now to the figures of the drawing, and particularly for the moment to FIG. 1, there will be seen a gain or receiver circuit, which is depicted in greater detail in FIG. 2. This receiver circuit 10 is provided with a series of connections at its left side which are labelled PC, DI, R, IP and IC. These individually labelled connections are continued so as to connect with a means 12 for providing time base, sequencing and strobing functions (FIG. 3). The labels PC, DI, R, IP and IC stand for power control, data input, reset, interrogation power, and interrogation chopper, respectively, the significance of which will be made apparent hereinafter.

Connected at the top of the receiver circuit 10 are three input connections 14, 16, and 18, which extend to a typical operations measurement system such as that described in copending application Ser. No. 861,339 assigned to the assignee of the present invention. The correspondence among these connections is as follows: 14 corresponds with connection or terminal 12A in the copending application, 16 corresponds with connection or terminal 54, and 18 with connection or terminal 59.

It will be seen in FIG. 2 that a means or device 20 is depicted as representative of the operations measurement system from which readings are to be taken. Accordingly, the common connection and terminal 14 seen in that figure corresponds with the common bus for the measurement system; the positive power terminal 18 connected to the transducer is an extension of the power bus for the measurement system; and a data input connection 16 seen in FIG. 2 is an extension of the data bus coming from the operations measurement system.

For providing the required time base, a pair of terminals $X_0$ and $X_1$ are connected internally, as seen in FIG. 3, to a 32.768 kilohertz oscillator 30. If preferred, an external crystal 32 is connected across the terminals $X_0$ and $X_1$.

Figure 6:
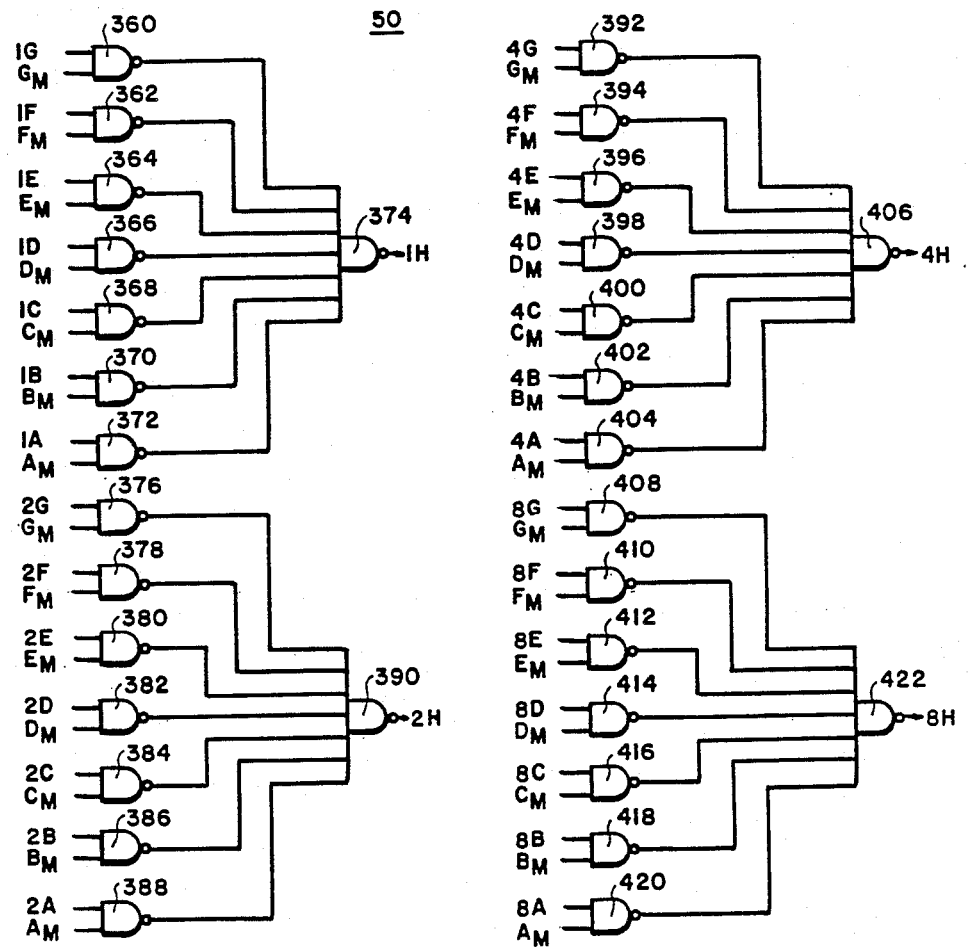
FIG. 6 is a block-schematic diagram of a segment concentrator.
Figure 7:
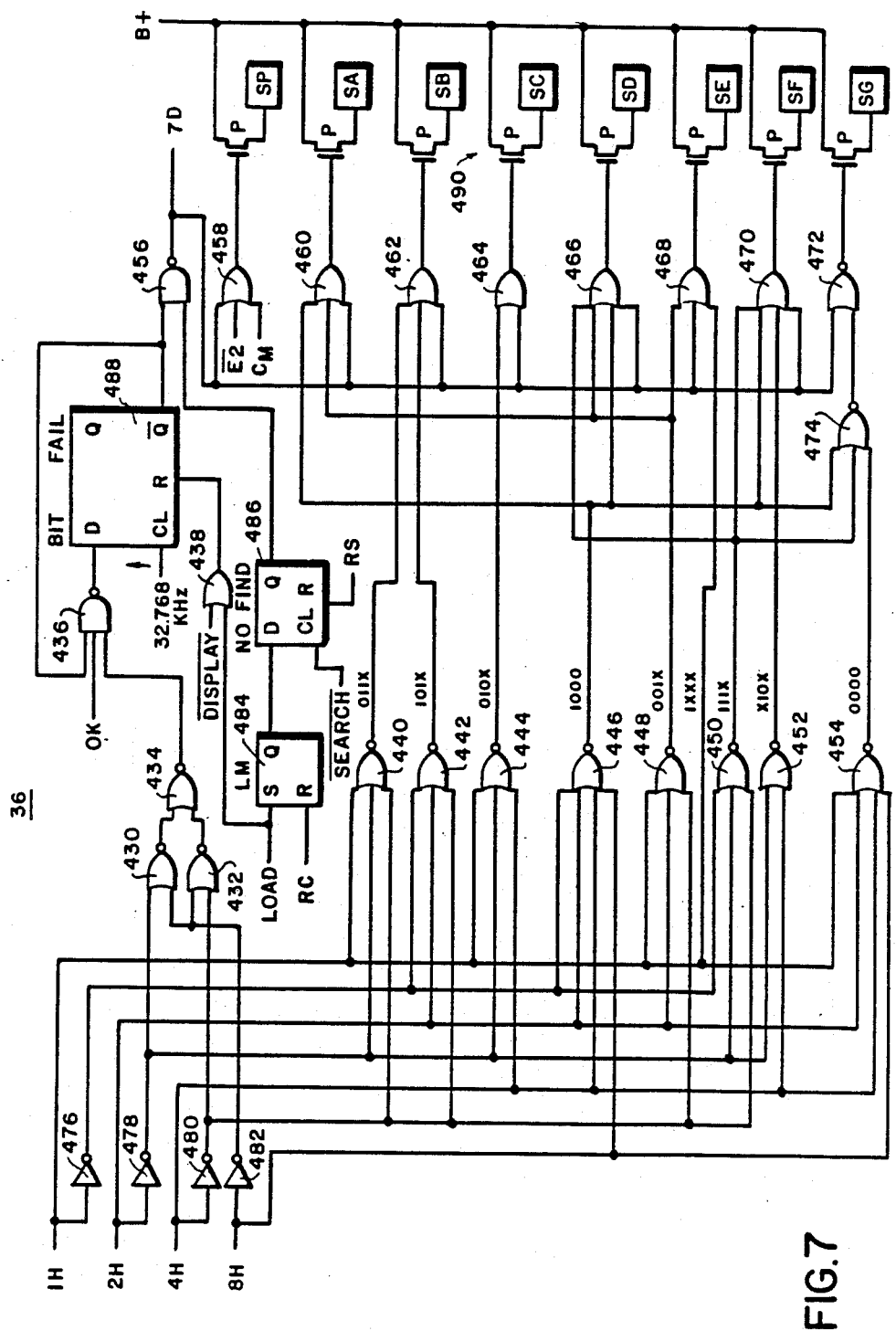
FIG. 7 is a block-schematic diagram of a BCD-to-seven-segment decoder and seven dashes generator.

The time base, sequencing and strobing means 12 is additionally connected by the connection 34, seen in FIG. 1, to the means 36, which is designated a binary coded decimal to seven segment decoder and seven dashes generator, and which is illustrated in further detail FIG. 7. Another connection 38 is made from the means 12 to a means designated 40, comprising a digit selection, intensity modulator and leading zero blanking device, illustrated in further detail in FIG. 5. Further provided is connection 42 from means 12 to means 44, the latter comprising a shift register and AB driver, which are illustrated in further detail in FIG. 4. A connection 46 extends from the aforenoted shift register and AB driver 44 to the means 40 illustrated in further detail in FIG. 5. Also extending from the means 44 is a connection 48 to a segment concentrator 50 illustrated in further detail in FIG. 6. The segment concentrator 50 is connected by connector 52 to the aforenoted means 36. Yet another connection is connection 54 from the means 40 to the means 50.

Other connections in the scheme of block diagram FIG. 1 are as follows: one connection labelled AB involves an output AB from means 44 to the receiver circuit 10. Also, a connection, involving a low voltage output designated LV, extends from the receiver circuit 10 to the input LV on the means 40. Yet another connection is furnished from the means 44 to the means 36 by the output OK (FIG. 4) which, it will be understood, is connected to the identical input designated OK on the means 36 (FIG. 7).

Referring back to FIG. 2, it will be understood that this receiver circuit 10 is especially designed to provide "single cycle" operation. As will be explained hereinafter, "continuous" operation is also feasible. In this single cycle mode of operation, one of the transducers $A_s$ or $B_s$, as shown within the means symbolized by the block designated 20, is powered by an application-specific integrated circuit known as SK 1561 IC. This integrated circuit integrates within one chip all of the means 12, 36, 40, 44, and 50 already described in general functional terms. However, the DC supply source is as illustrated in FIG. 2, being designated therein as "unregulated system power." This unregulated source 60 is connected to a reverse protection diode 62, and to a network, including a switch 66 in series with resistors 68 and 70; as well as a parallel combination of resistors 72, 74 in series with an NPN transistor 76. Further, a transistor 78 has its input in shunt with resistor 72. An output connection 80 extends down from the collector of transistor 78 to the plus input of an operational amplifier serving as a comparator 82; this arrangement permits a determination of whether an undesirably low voltage has appeared at the output of transistor 78.

Connected to the top of resistor 68 in the network, by way of resistor 84, is an output R. Additionally, an input PC located immediately below the output R is connected by way of the resistor 86 to the network; specifically to the base of transistor 76. It will be understood that these input or output terminals R and PC correspond with those seen connected in FIG. 1 between the time base circuit 12 and the receiver circuit 10 therein.

In operation, momentary closure of switch 66 causes a reset signal to be applied to initialize the integrated circuit known as SK1561IC. What this means is that the sequence controlled by means 12 will not start until this closure is released, that is, the switch 66 is released. Subsequent closures will restart the sequence regardless of the sequence's status. This feature is particularly useful for quick reacquisition if a fault is identified.

As soon as initialization occurs, a signal appears at the input PC in FIG. 2 (from the time base circuit of FIG. 3) to maintain sufficient input current to the NPN-PNP power switch pair for continued operation. This pair includes the transistors previously identified as 76 and 78. The output voltage at the collector of transistor 78 is reduced by a five-terminal series regulator 90 to 5.50 v DC with an approximate 2% tolerance. A resistor 104 and resistor 106 are connected to the output of the voltage regulator 90 and program the 5.50 v DC.

At an appropriate point in the sequence, which is controlled by the means 12 seen in FIG. 3, the output drivers 194 and 195 therein, having outputs designated IC and IP in that figure, become active and produce a relatively fast rising and falling voltage-doubled 9.5 volt pulse for activating either an $A_S$ or $B_S$ transducer within the means 20. For such voltage doubling a network 92 is seen in FIG. 2 connected to the terminals IP and IC (interrogation power and interrogation chopper respectively), and it includes the diodes 94, 96, and capacitors 98, 102. Further connected between the diode 96 and the terminal 18 of means 20 is a short circuit protection resistor 100.

It will be understood from the foregoing description that a specialized form of pulse power is being transmitted to the means 20, hence to the operations measurement system previously described.

Turning now to the data input side of the reader device, which includes the data input terminal 16 and the common terminal 14, these are connected to a network 108, which constitutes the "mating" part of the filter arrangement of the present invention. The other part of that arrangement is constituted by the necessarily high output impedance already noted (approximately 100,000 ohms) of the measurement system.

The network 108 includes oppositely shunt connected diodes 110 and 112, capacitor 114, and resistor 116, the connection from terminal 16 being made by way of resistor 118 (having a value of 10K). This resistor 118 effectively then serves as a continuation of the measurement system output impedance. The upper end of the network 108 is connected to the plus side of an operational amplifier 120, the negative terminal of which is connected to the junction point of a voltage divider comprising resistors 122 nd 124 for establishing the threshold voltage. This amplifier 120 thus develops the DI (data input) for the reader device, acting as a buffer and threshold voltage detector in processing data signals from the high impedance source provided by the measurement system. Accordingly, a relatively low rate of data transmission from the transducer in the means 20 is established. The threshold voltage is nominally 300 millivolts. The input resistor 118 and the back-to-back diodes 110 and 112 provide protection in the event of a system fault, diode 110 being for reverse protection. The comparator 120 has its reference level adjusted approximately half way up to the clamp level of diode 112. The complete arrangement permits transmission along hundreds of feet of twisted-pair cable, while maintaining extreme fault protection for both the transducer and the reader device.

It will also be noted that the negative terminal of the other comparator 82 is likewise connected to the junction point of the voltage divider comprising resistors 122 and 124; furthermore that suitable input resistors 130 and 132 are connected to the plus terminal of comparator 82.

The comparator 82, which develops the LV input, senses, as noted before, the unregulated system voltage immediately after the PNP transistor 78 of the power switch. If this voltage drops below 6.3 volts, a signal is sent to the means 40 (FIG. 5) and a suitable "dimming display" is created at the output of this means. Thus, as seen in this figure, each of the drivers DA-DG transmits an energizing signal to a respective LED (not shown) in an intensity modulated manner. The dimming is achieved by time modulation. Due to receipt of signal A13 from counter A, 4 Hz alternation from full brightness to half brightness is accomplished.

Identification of the in the means 20 as being either class A or class B is accomplished from the data transmitted from the operations measurement system, that is, from the means 20. This will be explained in some detail hereinafter; but with reference to FIGS. 2 and 4, the required information is presented at the AB output of the means 44 in FIG. 4; that is to say, the shift register and AB driver arrangement. As explained previously, connection is made from the AB output of the means 44 to the AB input, seen at the far right in FIG. 2, at which connection is made to a node 129. Identification of transducer A is made by means of a light emitting diode 131 and its accompanying resistor 133, whereas identification of transducer B is accomplished by means of the light emitting diode 135 and its accompanying resistor 137.

As will be readily understood, a suitable voltage level is applied at the AB input in FIG. 2 such that, in the case of transducer A, the LED 131 is energized. This is because the voltage level at AB is then sufficiently high to produce this result, whereas, in the case of the identification of transducer B, the voltage level at AB is sufficiently low such that there is a sufficient potential difference between B+ and that voltage level to produce energization of LED 135. In the latter case, that is, identification of transducer B, what is indicated is that the transducer is one which is counting the number of events; hence a decimal point is not needed whereas in the case of identification of transducer A it means that a decimal point is required to indicate the number of elapsed hours. When so required, it will be seen from FIG. 4 that an appropriate logic value is then present in bit position E2 to cause generation of an E2 signal at the output of inverter 270. Likewise, in FIG. 5 it will be seen that an appropriate output value $\overline{Cm}$ is generated and applied to an input of gate 458 in FIG. 7, thereby to effect activation of the decimal point driver SP in the sequential LED display 490.

It should be especially noted that in the particular mode under discussion, that is, single cycle operation, the LED display 490 is activated approximately six seconds after initialization and remains active for fifteen seconds. What this means is that the individual digit drivers, already indicated, that is drivers DA-DG in the means 40, as well as the series of segment drivers SG, SF, SE, SD, SC, SB, SA, and SP, seen in FIG. 7 as part of the means 36, are activated at these predetermined times.

Referring now in detail to the block schematic diagrams of the several means illustrated in FIGS. 3-7, it has been mentioned previously that all of these means or components are integrated in a single chip known as an SK1561. All of the gates involved in these respective means are shown schematically and with conventional symbols representing AND, NAND, OR, NOR, logic gates. All of the flip-flops seen throughout the figures, as well as the input and the oscillator 30, are shown in block diagram form; whereas outputs are shown in both forms. Any output which may be an open drain configuration is shown schematically, with open drain N channel or P channel transistors, as required.

Time Base Sequencing and Strobing (FIG. 3)

The logic gates in FIG. 3 are designated by the following even numbers: 150-182; regular and inverting amplifiers by the even numbers 184–206; Schmitt triggers by the even numbers 208–212; flip-flops by the even numbers 214 and 216; and counters A, B, C, and D by the even numbers 218–224.

One particular feature to be noted in respect to the means 12, and particularly as to its time base, sequencing and strobing functions, is that the basic machine cycle is 64 seconds in duration. The first cycle, after the reset (R) initialization already described, differs from all subsequent cycles in that the display is blanked until the first data search is complete. Thereafter, the display remains active, except for short blanking intervals during data refresh.

The first machine cycle is illustrated in the timing diagram shown in FIGS. 8 and 9. Subsequent cycles will be identical to that shown in FIG. 9 except that "DISPLAY" remains at a logic 1. Also, PC goes to a logic 1 at the beginning of reset (R) during the first cycle, and also on the falling edge of A20 on subsequent cycles.

The 32.768 kilohertz oscillator 30 seen in FIG. 3 is controlled, as already noted, by the external crystal 32, being designed for Pierce (or parallel) operation. This crystal is shown as the only external component, as the phase shift capacitors and amplifier may be integrated within the integrated circuit. The oscillator 30 starts within one second after power is applied (see FIG. 8—where the delay is shown exaggerated). It should be particularly noted that the counter 218, or A counter, is a ripple binary counter and advances on falling edges only. The outputs IC and IP (outputs symbolizing interrogation chopper and interrogation power respectively) are derived exclusively from the A counter and therefore change state on falling clock edges. More specifically, the outputs of the A counter that are particularly involved are A2, A15, A16, A17, A17, A18, A19, and A20. As seen in FIG. 8, IP is normally at logic 0, and goes to logic 1 for precisely three seconds; whereas IC is normally at logic 0 and then oscillates between logic 0 and logic 1 at an 8.196 kilohertz rate whenever IP is active.

Referring now to flip-flop 214, the Q output thereof labelled "SEARCH" sets and resets on a rising clock edge (see FIG. 8), one half clock cycle after the data input to the flip-flop 214 changes. The output RC is a necessary "first" reset and is a redundant reset during continuous operation. "SEARCH" is normally at logic 0 and goes to a logic 1 for precisely 1.5 seconds.

Referring now to flip-flop 216, the Q output labelled "DISPLAY" sets on the rising edge of "SEARCH" and therefore sets on a rising clock edge. RS, seen at the output of trigger 210, is a once, and only once, initial reset. RS is asynchronous and is in phase and "squared up" (because of the Schmitt trigger 210) with respect to the input R (seen at the input of the trigger 210).

It will also be appreciated that RC equals RS whenever A21 is a logic 0 because of the OR gate 170. RC is therefore asynchronous during startup and synchronous during continuous operation. It will also be understood that the "DATA" and "$\overline{\text{DATA}}$" outputs are the in-phase and out-of-phase "squared up" versions of the input labelled DI (just below the input R) in FIG. 3. These outputs are both asynchronous.

The counter 220, or B counter, advances on the falling edge of A7 (FIG. 10) during "SEARCH" (input of logic gate 168), provided that the reset R of counter 220 has been released by RC and $\overline{\text{DATA}}$ (inputs of logic gate 172). It therefore advances on a falling edge of the clock. If "$\overline{\text{DATA}}$" remains at a logic 0 until the B counter reaches a state of 0000001, the B counter's clock loop will lock up, having counted 61 cycles on A7 alternations (238.28 milliseconds). The B counter will normally be reset when $\overline{\text{DATA}}$ returns to logic 1 and is, therefore, prepared to repeat the count-out cycle. When B7 returns to logic 0, the B counter will advance one count. If it counts 61 cycles of A7 alternations for a second time (during the search interval), it will be armed and ready to advance the C counter, or counter 222, a second time.

It will be appreciated that the above-described operation constitutes a "rough frequency check". Thus, the half cycle is at least 238 milliseconds long. Moreover, two cycles have to occur during the search operation to "arm" the acquisition sequence. Of course, it will be understood that the degree of resolution in performing the frequency check can be as fine or precise as desired The counter 222 or C counter has two stages, C1 and C2, and C2 completes its final transition to a logic 1 on an asynchronous falling edge (reset by "DATA" is asynchronous). Subsequently, this enables falling edge clock counting by the D counter, also designated 224. After 32 counts of the clock (976.56 microseconds), the first strobe (D6 rising edge) is generated. Subsequent strobes are spaced 1.953 milliseconds apart. After 32 strobes are generated, the loop will lock up, as D12, the last stage of the D counter, will go to a logic 1 on the falling edge of the thirty-second strobe. The interval during which the strobe generator is functional is defined as "LOAD" and "$\overline{\text{LOAD}}$".

The power control signal PC, which is developed by the logic effected by the combination of logic gates 174, 176, 178 and the invertor 202, is generated directly from the A counter, as will be apparent from FIG. 3. This power control signal may contain switching transients, which are permissible.

It is to be noted that the A, C, and D counters reset to all zeroes, whereas the B counter resets to 1100000 as shown in FIG. 3.

Figure 4:
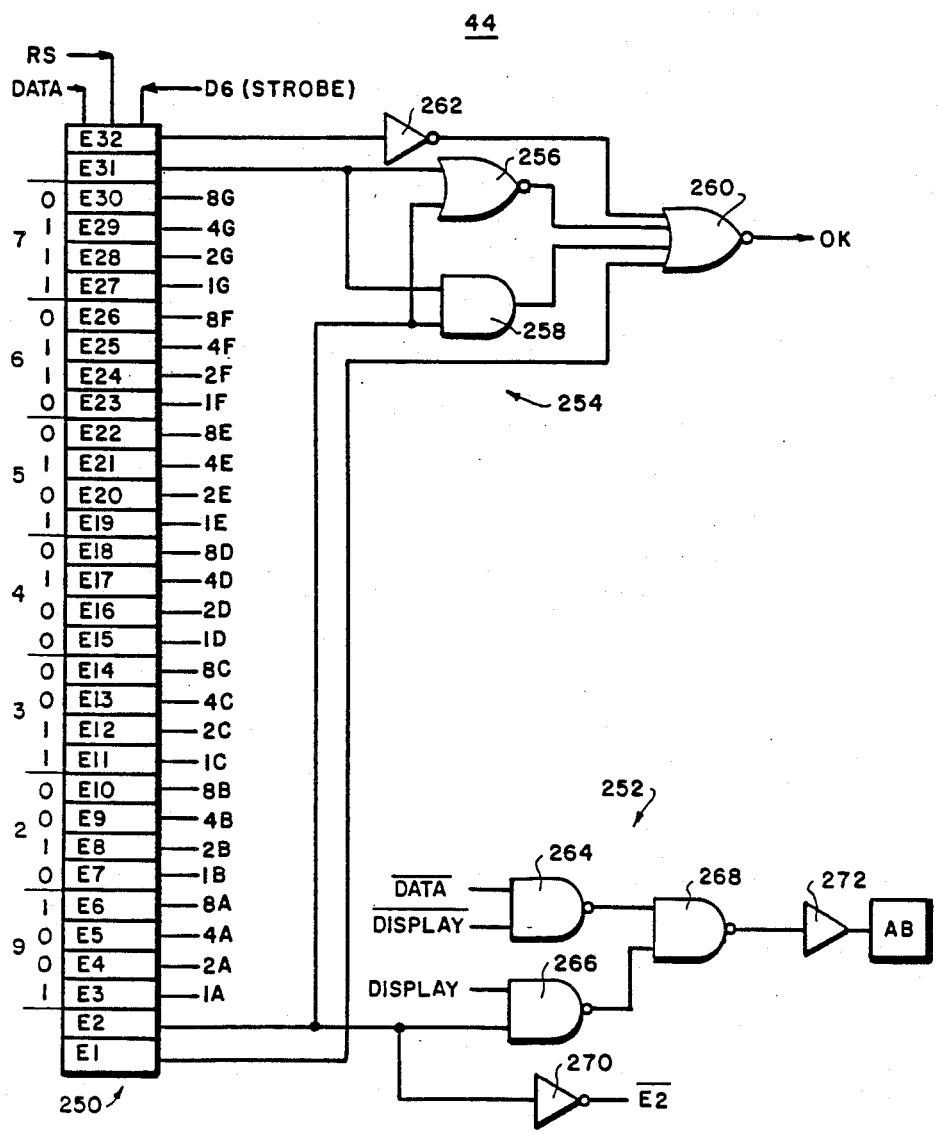
FIG. 4 is a block-schematic diagram of a means comprising a shift register and AB driver.

Shift Register and AB Driver (FIG. 4)

The elements forming means 44 are seen in schematic form, such means comprising a shift register 250 and an AB driver 252. Additionally included is an OK driver 254.

The shift register 250 is 32 bits long and, when loaded by way of the data input seen at the top of the figure, contains twenty eight BCD (binary coded decimal) bits, an AB bit, and three check bits (E1, E31, and E32. As has been noted previously, these check bits allow for checking on various functions and operations of the system. Shift register 250 is reset once, and only once, during startup by dint of the RS input, also seen at the top of FIG. 4. This RS input is only used for testing, as each loading sequence essentially clears the register by pushing in "new" dat. "DATA" is shifted each time the input at D6 (strobe or enable) presents a rising edge at the clock input.

It will be noted that logic gates 256, 258, 260, and an inverter 262 are included in the OK driver circuit. AB driver circuit 252 includes logic gates 264, 266, 268, as well as inverter 270 and amplifier 272.

If all of the following conditions are met, the "OK" output will have a logic 1 signal: bit E1 should be logic 0, bit E32 should be logic 1, and bit E31 should be the inverse of bit E2. It will of course be understood that all the other bit positions E3–E30 contain the binary coded decimal data. For example, the first binary coded decimal includes bits E3, E4, E5, and E6, whose output lines are designated 1A, 2A, 4A, and 8A in FIG. 4.

It will be appreciated that by making the thirty-first bit the complement of the second bit, then, in checking for that complement status one checks on whether the reader clock is within reasonable synchronism with, for example, the elapsed time chip clock (of the measurement system) which is determining the data source clock rate.

The OK output of the means 44 illustrated in FIG. 4 is connected to the OK input of the means 36 depicted in FIG. 7, specifically to the input of logic gate 436; whereas the output AB, as noted previously, connects to the AB input or terminal of FIG. 2. The AB output serves two functions. First, it signals the presence of data during the initial 5 seconds of the first machine cycle. Second, it shows the status of the E2 bit after the display is enabled ("DISPLAY" becomes a logic 1 at 5 seconds and remains there until power is removed, or is externally reset via "R"). During the first five seconds, AB will be logic 1 whenever "$\overline{DATA}$" is logic 1, and logic 0 whenever "$\overline{DATA}$" is logic 0. After the first five seconds, AB will be logic 1 whenever E2 is logic 1, whereas AB will be logic 0 whenever E2 is logic 0.

As has been noted previously, the output "E2" in FIG. 4 is connected to an input of logic gate 458 of means 36 in FIG. 7 for decimal point display purposes.

Figure 5:
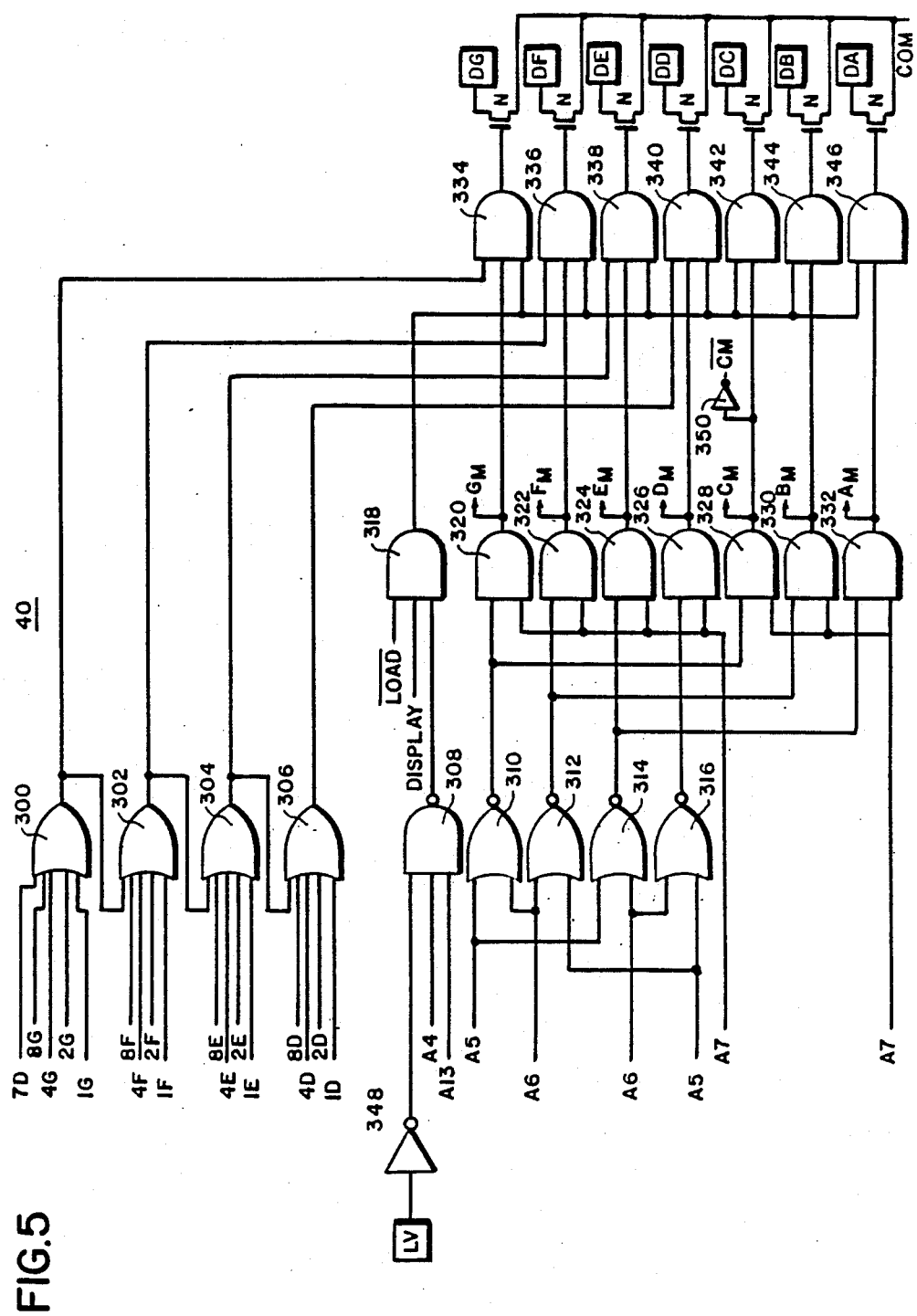
FIG. 5 is a block-schematic diagram of a means comprising a digit selector, intensity modulator, and leading zero blanking device.

Digit Selector, Intensity Modulator and Leading-Zero Blanking (FIG. 5)

Referring now to FIG. 5, there is depicted the means 40 which includes an arrangement for digit selection, intensity modulation, and leading-zero blanking. Logic gates having conventional symbols are designated by the following even numbers: 300–346; inverters are designated 348 and 350.

With respect to the leading-zero blanking feature, all seven digits are usually blanked if "DISPLAY" is logic 0 and/or "$\overline{LOAD}$" is logic 0. However, if 8G, 4G, 2G, and 1G are zeros, the result of the logic imposed by the logic gates 300–306 is that the DG driver seen at the top of the group of digit drivers on the far right in FIG. 5 will be "blank" regardless of the general display/blank commands. If in addition to 8G, 4G, 2G, and 1G being zeros, 8F, 4F, 2F, and 1F are also zeros, the DF driver will also be blanked. This process continues through the four leading digits. The three least significant digits are always displayed (when commanded), regardless of their decimal status.

Although it will be appreciated that the scheme seen in FIG. 5 for blanking zeros is not an essential one, nevertheless, it provides significant conservation of power; it also makes it much easier for the display to be read when unnecessary zeros are blanked.

Figure 10:
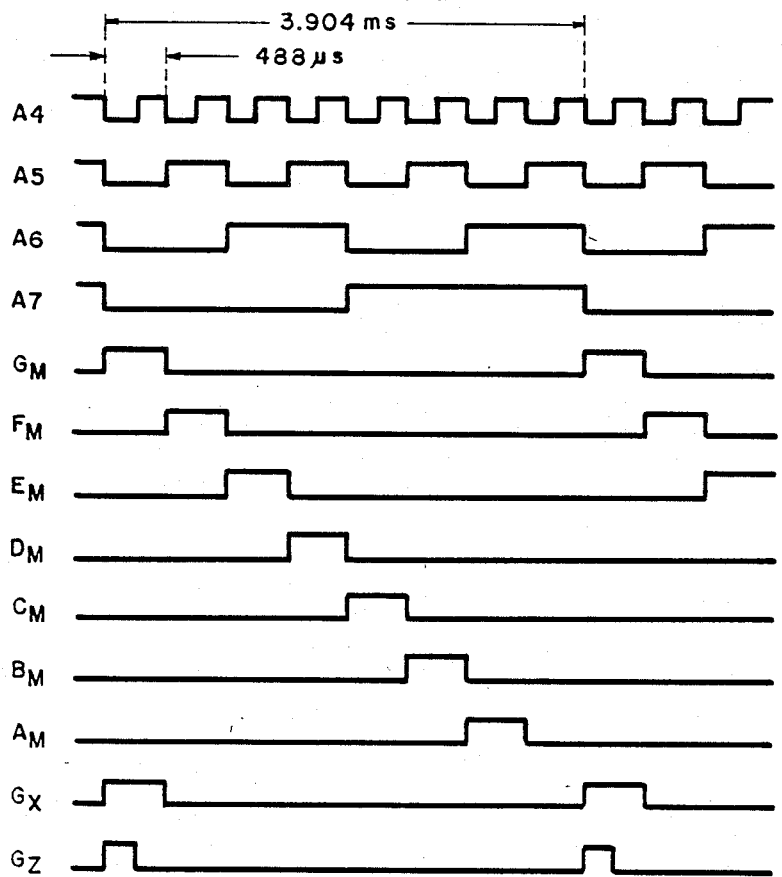
FIG. 10 is a timing diagram for the digit selector and segment concentrator means.

Digit selection is derived directly from the A counter, the particular inputs for this purpose being A5, $\overline{A5}$, A6, $\overline{A6}$, A7, $\overline{A7}$. FIG. 10 summarizes the selection sequence. The logic imposed by the gates 310–316 in FIG. 5 on the signals A5, $\overline{A5}$, A6, $\overline{A6}$, and the further logic imposed by the gates 320–332 on the resultant signals therefrom, as well as on the logic signals A7 and $\overline{A7}$, yields outputs at the latter gates which are designated $A_m$–$G_m$ (modulation signals). The sequential pulse patterns of these modulation signals $A_m$–$G_m$ can be appreciated from FIG. 10. In addition to the signals $A_m$–$G_m$ being transmitted to the respective drivers DA–DG by way of the respective logic gates 334–346 in FIG. 5, the signals $A_m$–$G_m$ are also transmitted to the means 50 in FIG. 6, the purposes of which will be explained hereinafter.

Also, the specialized output $C_m$ from the inverter 350 in FIG. 5, which is connected to AND gate 328, is extended to the means 36 in FIG. 7, being connected to an input of OR gate 458, to which the previously noted input E2 is also connected.

Referring now to the input side of means 40 in FIG. 5, it is arranged, for indicating the aforenoted low voltage condition at receiver 10, that when the input LV is logic 0, it enables a 4 hertz intensity modulation which causes the display brightness to alternate between full and half brightness at the 4 hertz rate. FIG. 10 shows the effect on a typical digit driver DG. As will be seen at the bottom of this figure, there are differing signal pulse forms for $G_x$ and $G_z$ as a consequence of the logic imposed by gates 308 and 318, responsive to their respective inputs A4, A13, and $\overline{LOAD}$, DISPLAY.

Segment Concentrator (FIG. 6)

The segment concentrator 50 consists of four channels of seven line to one line time division selection. Thus, there will be seen in FIG. 6 four groups of seven logic gates, the first group comprising NAND gates 360–372, all having their outputs tied to the inputs of NAND gate 374 whose output is designated 1H. The second group of logic NAND gates is evenly numbered 376–388, all of whose outputs are connected to the inputs of NAND gate 390 whose output is designated 2H. A third group is numbered 392–404, all of whose outputs are connected to NAND logic gate 406, whose output is designated 4H. A fourth group is numbered 408–420, all of whose outputs are connected to NAND logic gate 422 whose output is designated 8H.

Accordingly, it will be appreciated that the seven binary-coded digits being processed are concentrated by the means 50 into a single time sequence digit in order to reduce the BCD-to-seven segment decoding to a single entity. This concentration is accomplished by applying to the inputs of the logic gates in FIG. 6 particular time-division signals from the respective outputs of the logic gates 320–332 in FIG. 5. Accordingly, at a given instant of time the $G_m$ signal, which is representative of the most significant decimal digit, is applied to inputs of logic gates 360, 376, 392, and 408. At this same instant of time, binary coded signals representative of the most significant decimal digit are being transmitted from bit locations E27–E30 in FIG. 4 by way of output lines 1G, 2G, 4G, and 8G. Therefore, they are, at that instant, also operative at the inputs of logic gates 360, 376, 392 and 408. Therefore, resultant signals 1H, 2H, 4H and 8H, which at that instant of time correspond with the most significant decimal digit, are thence transmitted to the inputs correspondingly designated in FIG. 7. At other instants of time, the other modulation or time-division signals $A_m$–$F_m$ are similarly transmitted and then similarly produce the resultant signals 1H, 2H, 4H, and 8H shown in FIG. 6.

BCD-To-7 Segment Decoder and "7 Dashes Generator" (FIG. 7)

Included in the means 36 are the even numbered logic gates 430–474; the inverters 476–482; and the flip-flops 484, 486, and 488. Connected to the outputs of the respective gates 458–472 are P channel devices, which are the segment drivers SP, SA, SB, SC, SD, SE, SF, and SG. The uppermost of these, that is, driver SP takes care of the decimal point which, as noted before, is required when the reader is receiving information about cumulative numbers of hours, that is, from an events counter. The decimal point P (seen in FIG. 11) is assigned a time slot allocated for the "DC" digit driver (FIG. 5) in order to uniquely access that point in a dedicated 8 segment by seven digit (15 line) LED array, as for example shown in FIG. 13. It will be understood that the decimal point is enabled when E2 is a logic 0.

Figure 11:
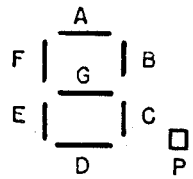
FIG. 11 is a diagram comprising a segment map of the seven segments in each digit display element.

It will be seen that the outputs from the segment concentrator 50 (FIG. 6); that is to say, the outputs 1H, 2H, 4H, and 8H, are continuously decoded from BCD into the 7 segment format by the gate array, which includes logic gates 440-454 in FIG. 7. Thus, taking as an example the instant of time when the outputs 1H, 2H, 4H, and 8H correspond with the desired transmission of the most significant decimal digit from the shift register 250 of FIG. 4, then, by the imposition of the logic provided by the gates seen in FIG. 7, that is, the gates 440-454 and 456-474, appropriate segments in the segment display shown in FIG. 11 are then capable of being illuminated to indicate the presence of that most significant digit. This results from the fact that there are logic zeros present it the appropriate logic gates immediately preceding the affected P channel devices, or segment drivers, corresponding to those appropriate segments, whereby such devices become conductive. It should be noted that the given combination of segment signals are capable of being transmitted to all of the LEDs defining all of the display digits; however, it is only in the case where a particular digit driver, such as one of the drivers DADG (FIG. 5), has a logic one present at its immediately preceding logic rate that particular driver will be turned on, whereby the given segment signal combination is displayed at the display position corresponding with that driver. This operation will be made abundantly clear when an exemplary seven digit number display situation is described hereinafter.

It should be noted that the output line marked 7D (immediately above the segment driver SP), is connected back to the means 40 in FIG. 5; that is, it is connected to the uppermost input labelled 7D in that figure. Thus, this "7 dashes generator" signifies that an error has occurred and it takes precedence over digit data. Output line 7D also connects to all the NOR gates 458-470 in FIG. 7, causing the outputs at each to become a logic 1, except at NOR gate 472 which becomes a logic 0. Hence, segment drivers SP-SF go OFF because each respective P channel device is OFF. However, segment driver SG is ON because of the output state at NOR gate 472.

Three fault conditions lead to the generation of "7 dashes" in the display. The first condition is an illegal BCD number, and it is flagged by the "bit fail" flip-flop, that is to say, flip-flop 488. The second condition is an illegal logic statement in locations E1, E31, or E32 of shift register 250, which is also flagged by the flip-flop 488. The third condition is the inability to find two acceptable data groups within the search interval, and it is flagged by the "no find" flip-flop, that is, flip-flop 486.

The "bit fail" flip-flop 488 is set on the rising edge of a clock if the data input is logic 1. The logic 1 can signify that the 8H bit is present simultaneously with the 4H bit and/or a 2H bit. The 2H, 4H, and 8H bits change their states in response to the A counter and therefore, change on the falling edge of a clock pulse. A logic 1 can also signify that there is an illegal logic state in at least one of the shift register locations E1, E31, or E32. The flip-flop 488 is initially held reset by the presence of the $\overline{\text{DISPLAY}}$ at the input of OR gate 438. This flip-flop is subsequently reset each time new data is shifted into shift register 250 (during "LOAD"). The first failure causes flip-flop 488 to lock up via the feedback from $\overline{\text{Q}}$. It can only be released via a reset.

The "no find" flip-flop, that is, flip-flop 486, will produce a logic 0 at its Q output if a valid "LOAD" signal had not been developed during the "SEARCH" interval. During each complete sequence cycle, the "LOAD" memory (LM flip-flop or flip-flop 484) will either remain reset or be set by "LOAD" if the "SEARCH" was successful.

When the "SEARCH" interval is complete, the data in flip-flop 484 will be transferred to flip-flop 486 on the rising edge of "$\overline{\text{SEARCH}}$". If there is a logic 1 present therein, the display will be undisturbed. On the other hand, if a logic 0 is present, the display will show 7 dashes (for 15 seconds in the single cycle mode or 64 seconds in the continuous mode).

Operation

The operation of the complete or composite system including the reader device of the present invention and the measurement system as described, for example, in application Ser. No. 861,339 filed May 9, 1986, is herewith set forth. FIG. 5 of the copending application is a timing diagram depicting a preferred format in which the readout data is presented by the serial encoder 50 and the output buffer 52 in the measurement system to the reader (FIG. 4) in that same application. In the present application, as has been noted by reference to FIG. 2, transducer 20 symbolizes that serial encoder and output buffer. The recorded data is read out such that a serial stream of data appears at the terminals 14 and 16 in FIG. 2 of this application. Each data readout cycle begins with a positive-going signal voltage front indicating constant logic 1 up to a predetermined point in time, at which point the voltage drops to a logic 0 level.

The data presented at the terminals 14 and 16 in FIG. 2 herein is indicated by the presence or absence of logic 1 signals over a series of intervals numbered 1-32, which correspond to the bit positions or locations E1-E32 in FIG. 4 of this application. As noted previously, the bit positions E1, E2, E31, and E32 are for special purposes: namely, E1, E31, and E32 are for checking purposes to ensure that certain criteria have been met; whereas E2 is indicative of which type transducer is involved in the measurement system, which determines whether or not a decimal point is to appear in the display.

It will be understood that other output signal formats could be employed without departing from the spirit of the invention.

Now assuming, for example, that the switch 66 in FIG. 2 is momentarily closed. Then, the already described action takes place; that is, pulse power is sent out by way of terminals 18 and 14 to the measurement system. Consequently, as described in copending application Ser. No. 861,339, the data stored in the measurement system, which typically could be an elapsed time indication for the operation of a piece of equipment, is read out.

Now assuming that, for example, the data stored in the measurement system has a decimal value of 7654329. This data in binary-coded decimal form will be transmitted in accordance with the low data rate of 500 Hz, and will be amplified and processed by amplifier 120, which has the output DI. Thus, it will be understood that a serial stream of BCD data appears at the output DI of amplifier 120 (FIG. 2), which is connected to the input designated DI in FIG. 3. This stream of data is then entered into shift register 250 (FIG. 4) by dint of the DATA, RS and D6 (strobe or enable) inputs already noted. The binary-coded values representative of the exemplary decimal value 7654329 being transmitted are seen immediately to the left of respective bit locations E3-E30 of shift register 250 in FIG. 4.

The decimal digit 7 which appears as the most significant digit in FIG. 4 is transmitted in binary coded form on the output lines 1G, 2G, 4G, and 8G to the segment concentrator 50 of FIG. 6. In this particular case, that is, for the decimal digit 7 which is being transmitted, a binary value of "1" appears at the input 1G of the logic gate 360 in FIG. 6; whereas a binary value of 1 also appears at the input 2G of logic gate 376; and, a binary value of 1 at the input 4G of the logic gate 392; however, a binary value 0 appears at the input 8G of logic gate 408.

Figure 12:
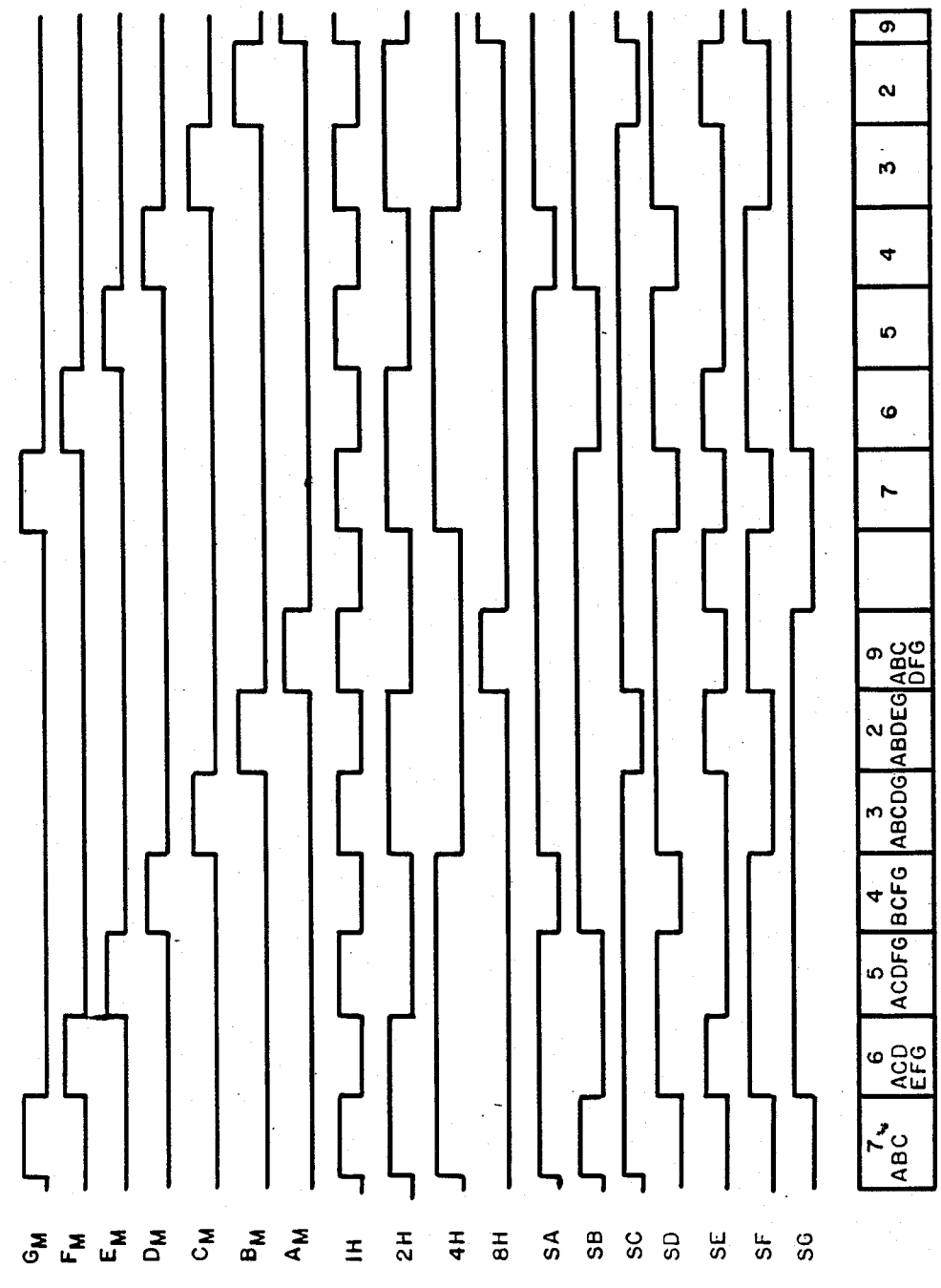
FIG. 12 is a timing diagram illustrating the correlation between the modulation or time-division-controlling pulse signals $A_m$–$G_m$, the 1H, 2H, 4H, and 8H signals from the segment concentrator, and the segment driver signals SA–SG.

Because the time-divisional multiplex signal $G_m$ also appears at another input of those same respective logic gates for reasons already given (see FIG. 12), the binary coded signals at the outputs 1H, 2H, 4H, and 8H in FIG. 6, and hence at the corresponding inputs in FIG. 7, have values respectively of 1110. Thus, as can be appreciated from the timing diagram of FIG. 12, the appearance of these signals produces at the segment drivers SA-SG in FIG. 7 the pulse patterns seen in FIG. 12. Consequently, as seen at the bottom of FIG. 12, the suitable decoding that takes place in the decoder of FIG. 7 yields a combination of segment illuminations ABC which define the decimal digit 7 which is to be displayed at the particular digit display location representing the most significant digit. However, as noted previously, it takes the coincidence of the appropriate signals to the segment drivers SA, SB, and SC of FIG. 7 plus the appropriate signal to the digit driver DG of FIG. 5, to produce the result just described, that is, the illumination of the digit 7 in the most significant digit location.

It will be apparent from FIG. 12 that the other digit locations for the given exemplary decimal number 7654329 are similarly illuminated. It will be noted that the eighth position or location is blank. This is because for one eighth of the cycle, no digit driver is activated; hence, the data is ignored.

It should be pointed out that a significant economy in the logic design is effected by the time division or multiplex scheme just described because such scheme requires only the simplified logic layout seen in FIG. 6. Such time-division scheme results from the recognition that the so called "persistence of vision" allows for activating and illuminating a selected digit for only one eighth of a total cycle, as in the example just described of the digit 7 being displayed. Thus, although this particular digit is not really activated with current flow for the other seven eighths of the cycle, it still remains visible to the observer's eye.

Alternate Embodiment

Although it has been indicated previously that two modes of operation are possible for the reader device, the preferred embodiment has been referenced to single-cycle operation, and, in that context, the receiver circuit is as depicted in FIG. 2. However, it is perfectly possible to operate on a continuous basis. In this mode of operation, the transducer is powered independently of the SK1561 integrated circuit, although preferably from the same power bus. Moreover, in such mode the alternate circuit embodiment depicted in FIG. 13 governs the operation. Thus, the clock is shown emanating from the transducer. The resistor-capacitor diode network is for "power on" reset, but may be eliminated (by connecting R to common) if the integrity of the data is unimportant during the first sixty seconds or so of operation. The "power on" reset guarantees that valid data will appear within six seconds, and that the display will remain blanked until valid data is received.

As will be noted, in this alternate embodiment the AB, PC, IP, and IC outputs are not connected (N/C).

Figure 13:
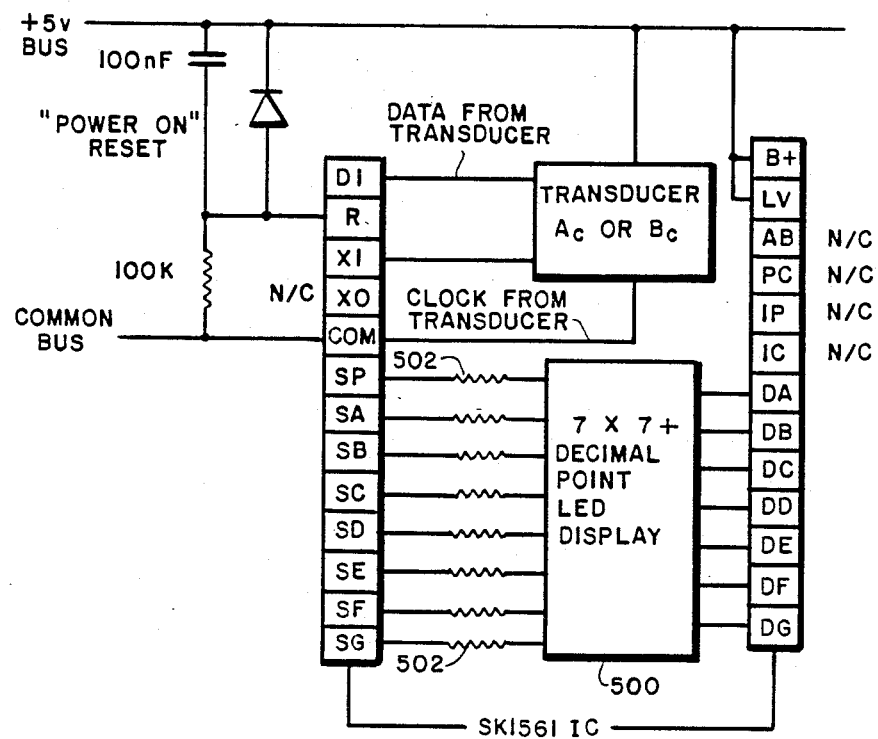
FIG. 13 is an installation diagram for an alternate embodiment enabling continuous operation.

The display 500 in FIG. 13 is a seven digit, seven segment, plus decimal point (if required), light emitting diode array. The display is updated at 64 second intervals and is blanked for 64 milliseconds whenever "new" data is acquired. Resistors 502 set the LED current.

It will be understood that the other outputs, that is, DI, R, and LD are connected as they were before in the preferred embodiment. Also, as before, the identification of whether the transducer is class A or class B is made, and the decimal point is placed appropriately.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

I claim:

1. A reader device for reading the data stored in a cumulative operations measurement system which includes a transducer, said reader device comprising:
    a source of fixed DC power, a clock source, and a source of pulse power derived from said clock source;
    interconnection means at said reader device for transmitting the pulse power to said transducer contained in said measurement system, thereby forming a composite system;
    means for sequentially providing DC power to the reader, and providing pulse power to activate said operations measurement system;
    means for acquiring the data present at the transducer and means for displaying such data at the reader device;
    further including means for providing plural checks on the composite system with respect to substantial identity of frequency between the clock source of said reader device and the clock source of said measurement system, and means for indicating faults in said composite system.

2. A reader device as defined in claim 1, in which said means for indicating faults provides for determining illegal binary coded numbers and illegal logic statements, and for displaying seven dashes as indicative of such faults.

3. A device as defined in claim 1, in which substantially all the elements recited therein, including said source of power, are integrated on a single semiconductor chip.

4. A device as defined in claim 1, in which a low-pass filter means is included in the transmission path between the output for the data stored in said measurement system and the input for such data in said reader, whereby an extremely low data rate of 500 Hz is established.

5. A device as defined in claim 4, in which the output impedance of said measurement system from which data signals emanate is at least 100,000 ohms, thereby to constitute a current source; said low-pass filter means being completed in said reader by means of a comparator to which connection is made from said measurement system.

6. A device as defined in claim 1, in which said reader device further includes:
a receiver circuit;
means for providing time base, sequencing and strobing functions for said reader device;
means for providing digit selection; and
means for decoding from binary-coded decimal digit signals to decimal digit segment signals for display purposes.

7. A device as defined in claim 6, further including:
a shift register;
a segment concentrator for logically combining a plurality of binary-coded decimal digital signals from said shift register with a respective plurality of time- based signals from said digital selection means to produce a time division set of resultant signals representing the decimal digits.

8. A device as defined in claim 7, further including means for connecting said shift register for receiving signals from said receiver circuit, and means forming part of said receiver circuit for determining the transducer type which is transmitting from said measurement system.

9. A device as defined in claim 8, further comprising means for sensing a low voltage condition in said receiver circuit, and means for displaying such low voltage condition.

10. A device as defined in claim 6, further including means for providing leading-zero blanking in the decimal digits transmitted to said means for displaying data at the reader device.

11. A device as defined in claim 6, in which said means for providing digit selection includes a plurality of digit drivers, and means for connecting said digit drivers respectively to a plurality of time base signals developed by such digit selection means.

12. A device as defined in claim 11, further including a plurality of segment drivers and means for connecting a time division set of resultant signals representing decimal digit segments to respective segment drivers.

13. A reading device for reading data recorded in an operations measurement system which includes a transducer, comprising:
a receiver circuit for providing single-cycle operation, said circuit including a source of fixed DC power, and a source of pulse power;
momentary closure means for initiating said cycle, said receiver circuit being operable for activating said source of DC power sequentially providing DC power to the reader, and providing pulse power to the transducer of said measurement system, said receiver circuit further including means for processing data signals from said measurement system;
a filter arrangement in said receiver circuit for enabling the processing of signals in said measurement system at a low data rate of the order of 500 Hz, the threshold voltage of the threshold detector of said filter arrangement having a nominal voltage of 300 millivolts.

14. A reader device as defined in claim 13, further comprising a transducer having a high source impedance of the order of 100,000 ohms connected as part of said filter arrangement.

15. A device as defined in claim 13, in which said means for first providing power to the reader includes:
a receiver circuit;
means for providing time base, sequencing and strobing functions for said reader device;
means for providing digit selection; and
means for decoding from binary-coded decimal digit signals to decimal digit segment signals for display purposes.

16. A device as defined in claim 15, further including:
a shift register;
a segment concentrator for logically combining a plurality of binary-coded decimal digital signals from said shift register with a respective plurality of time based signals from said digital selection means to produce a time division set of resultant signals representing the decimal digits.

17. A device as defined in claim 16, further including means for connecting said shift register for receiving signals from said receiver circuit, and means forming part of said receiver circuit for determining the transducer type which is transmitting from said measurement system.

18. A device as defined in claim 17, further comprising means for sensing a low voltage condition in said receiver circuit, and means for displaying such low voltage condition.

19. A device as defined in claim 15, further including means for providing leading zero blanking in the decimal digits transmitted to said means for displaying data at the reader device.

20. A device as defined in claim 19, in which said means for providing digit selection includes a plurality of digit drivers, and means for connecting said digit drivers respectively to a plurality of time base signals developed by such digit selection means.

21. A device as defined in claim 20, further including a plurality of segment drivers, and means for connecting a time division set of resultant signals representing decimal digit segments to respective segment drivers.

* * * * *

UNITED STATES PATENT AND TRADEMARK OFFICE
CERTIFICATE OF CORRECTION

PATENT NO. : 4,852,104

DATED : July 25, 1989

INVENTOR(S) : Eugene P. Finger

It is certified that error appears in the above-identified patent and that said Letters Patent is hereby corrected as shown below:

| | | |
|---|---|---|
| Column 2, | line 11, | Change "if" to --of-. |
| Column 3, | line 25, | Change "gain" to --main--; |
| | line 67, | Change "selection" to --selector--. |
| Column 6, | line 4, | After "of the", insert the word --transducer--; |
| | line 36, | Replace "of an E2" with --of an $\overline{E2}$ --. |
| Column 7, | line 36, | Replace "A2, A15, A16, A17, A17, A18" with --A2, A15, A16, $\overline{A16}$, A17, $\overline{A17}$, A18--. |
| Column 11, | line 9, | Replace "E2" with --$\overline{E2}$--; |
| | line 32, | Replace "DADG" with --DA-DG--; |
| | line 34, | Before "particular", insert --that--. |

UNITED STATES PATENT AND TRADEMARK OFFICE
CERTIFICATE OF CORRECTION

PATENT NO. : 4,852,104
DATED : July 25, 1989
INVENTOR(S) : Eugene P. Finger

It is certified that error appears in the above-identified patent and that said Letters Patent is hereby corrected as shown below:

Column 9, line 58, Change "A5, A6, A7, A7" to --$\overline{A5}$, A6, $\overline{A6}$, A7, $\overline{A7}$--;

line 60, Change "A5, A5, A6, A6" to --A5, $\overline{A5}$, A6, $\overline{A6}$--;

line 62, Change "A7 and A7" to --A7 and $\overline{A7}$--.

Column 10, line 4, Change "$C_m$" to --$\overline{C_m}$--;

line 8, Change "E2" to --$\overline{E2}$--.

Signed and Sealed this

Twenty-second Day of May, 1990

Attest:

HARRY F. MANBECK, JR.

*Attesting Officer*    *Commissioner of Patents and Trademarks*